United States Patent [19]
Nenicka

[11] 3,844,725

[45] Oct. 29, 1974

[54] METHOD FOR SEPARATING AND REFINING BY SINGLE STAGE OR MULTI-STAGE CENTRIFUGAL CRYSTALLIZATION

[76] Inventor: Vratislav Nenicka, 2362 Haymaker Rd., Monroeville, Pa. 15146

[22] Filed: Apr. 10, 1972

[21] Appl. No.: 242,561

[52] U.S. Cl. ............... 23/300, 23/269, 159/6 R, 159/45
[51] Int. Cl. .............................................. B01d 9/02
[58] Field of Search .......... 23/269, 300, 267 S, 295; 159/6 R, 45

[56] References Cited
UNITED STATES PATENTS

| | | | |
|---|---|---|---|
| 2,292,483 | 8/1942 | Rowell | 159/6 R |
| 2,536,676 | 1/1951 | Brown | 159/6 R |
| 2,561,256 | 7/1951 | Wilson | 159/6 R |
| 2,890,941 | 6/1959 | Bartlett | 23/312 S |
| 2,934,414 | 4/1960 | Bradley | 23/267 S |
| 3,230,050 | 1/1966 | Patterson | 159/6 R |
| 3,234,995 | 2/1966 | Van Den Berg | 159/6 R |
| 3,255,805 | 6/1966 | Bechard | 159/6 R |
| 3,292,999 | 12/1966 | Chirico | 159/1 C |
| 3,486,743 | 12/1969 | Todd | 159/6 R |
| 3,567,589 | 3/1971 | Javet | 159/6 R |
| 3,634,043 | 1/1972 | Lawrich | 159/45 |
| 3,640,330 | 2/1972 | Javet | 159/6 R |

FOREIGN PATENTS OR APPLICATIONS

| | | | |
|---|---|---|---|
| 846,173 | 8/1960 | Great Britain | 23/295 |
| 1,031,894 | 6/1966 | Great Britain | 23/295 |

*Primary Examiner*—Wilbur L. Bascomb, Jr.
*Assistant Examiner*—S. J. Emery
*Attorney, Agent, or Firm*—William Kovensky

[57] ABSTRACT

Purification of a crystallizable product by simultaneously subjecting a charge containing the product, impurities, and an auxiliary matter to centrifugal force and the vaporization of the auxiliary matter under controlled conditions to cause the product to form crystals which move radially outwardly while the mother liquor moves radially inwardly.

10 Claims, 9 Drawing Figures

METHOD FOR SEPARATING AND REFINING BY SINGLE STAGE OR MULTI-STAGE CENTRIFUGAL CRYSTALLIZATION

This invention pertains to method for separating certain desirable chemical compounds from a feed comprising the desirable compound and accompanying contaminants. The invention is useful where the desired compound is crystallizable, as opposed to amorphous, and where the desired crystals have a higher specific gravity than their mother liquor. Further, the invention requires that the melting point of the desired compound crystals be lower than the temperature at which that compound decomposes. Many substances, particularly organic compounds, meet these criteria. For example, phthalic anhydride, paraxylene, naphthalene, benzene, and many other aromatics, and many other compounds.

Broadly, the invention pertains to separation of or refining of crystallizable chemical substances. The invention is essentially a combined centrifugation and crystallization process. Many other conceptually different methods are available in the prior art for separating or refining of chemical substances. These prior known methods include distillation, centrifugation, stationary and continuous crystallization and solvent extraction. The present invention comprises essentially a combination of crystallization and centrifugation. The invention has important advantages over all of such prior methods, and over all prior combinations of these techniques.

Each of these prior techniques suffers from one or more difficulties or disadvantages which would not be encountered by the present invention. One problem is that a number of particular operations are required in many of the prior processes. That is, many different steps are required, or else the same step must be repeated many times, or even both of these disadvantages. In the present invention a single continuous step continuously yields an acceptably pure product.

Distillation, in particular, suffers from the problems of high heat consumption, which is itself undesirable, and which produces relatively high temperatures which can have deleterious effects on the materials being treated. Further, distillation is not desirable where the materials being separated are close to each other in boiling point temperature.

Another problem, especially in conventional crystallization, is that an unacceptably large percentage of liquid and occluded impurities are included in the product. In the present invention, combining centrifugation and crystallization, very high yields of substantially liquid and impurity free product can be obtained.

Another problem in many of these prior crystallization methods is that the crystal or solid product deposits itself on cooling surfaces and other portions of the apparatus, thereby necessitating the employment of wiping, scrubbing and cleaning equipment and methods, thus further increasing the costs of such schemes. In the present invention this problem is avoided inherently in the manner of operation, because of the direct removal of the heat of crystallization.

A feature of the invention is that means are provided to accommodate the cases of both miscible and immiscible auxiliary matters and feed stocks. Where the feed is immiscible, the auxiliary matter is fed to the separation cells separately.

Crystallization, either continuous or batch, as conventionally practiced, should not be confused with crystallization as used in the combination of the present invention. In the conventional prior crystallization art, it is necessary to grow relatively large crystals, and to operate at a relatively slow speed of crystallization at about the temperature of crystallization. The need in the prior art to operate at about the crystallization temperature and with slight sub-cooling requires relatively heavy, expensive, and fairly cumbersome equipment. The present invention, in its inherent operation, balances the heat required by the vaporization of the auxiliary matter and the heat produced by the crystallizing of the product to thereby completely eliminate any need for cooling equipment.

Centrifugal force with filtration has been used in the prior art for separating a crystal slurry comprising already crystallized solids entrained in liquids, but these methods are inherently different than the invention, and additionally suffer from the disadvantage that a film of the liquid and entrained impurities usually adheres to the surface of the crystals, thus requiring further purification or cleaning steps after the centrifugal separation. Another prior use of centrifugal force teaches a counter-current flow of the crystals and the melted final product to thereby wash the crystals. This comprises merely an extra washing step added to otherwise conventional crystallization processes. These problems do not occur in the present invention in that the desired material is not yet crystallized in the charge stock, and is simultaneously centrifuged out while being crystallized, to thus obtain a high purity product.

Thus, the invention comprises method and apparatus for the separation of a desired crystallizable (but not yet crystalline) substance from a charge including the substance, an auxiliary matter, and impurities. The method utilizes a continuously operating centrifugal type of apparatus and an auxiliary matter, which auxiliary matter may or may not additionally be a solvent. The heat absorbed by the essentially adiabatic evaporation of the auxiliary matter is utilized in the method of the invention to cause the crystallization of the product. A radial pressure gradient is set up in each rotating separation cell, which gradient is utilized in the purification of the desired substance in that it has an effect on vaporization and temperatures in the cell. All of these factors and forces together cause the desired material to crystallize as it migrates outwardly in the separation cells towards the peripheral wall of the centrifugal apparatus. The invention also provides a countercurrent flow of the product through its melt with an increasing concentration of product to thereby provide an inherent cleaning or scrubbing of impurities off of the freshly formed crystals of product. Heat transfer means are provided outside the centrifuge apparatus to melt the purified crystals and to form a moving ring to facilitate the flow of product out of the apparatus. This ring contains both recirculated melted product and newly formed crystal product in a suspension. Thus, the desired material is simultaneously crystallized, purified and cleaned, and then removed from the apparatus in a single step. The mother liquor with the auxiliary matter, due to physical differences in their characters, flow countercurrent to the newly formed product, thus cleaning the product crystals. The flow of the ring of suspended and melted product is so controlled that some melted product is forced back into the cells, thus further enhancing the automatic cleaning action on newly formed product crystals. The mother liquor and auxiliary matter are easily separated from each other later, and the auxiliary matter is then recirculated. Means may be also provided to conserve heat energy in the auxiliary matter cycle, thus enhancing the economies of using the invention.

The invention may be embodied in a plurality of different apparatuses, each having certain features not present in the others. The basic concepts of the invention, as sketched out above, are embodied in these various apparatuses and features, but the features are interchangeable one with the others. Further, the various pieces of apparatuses may be ganged to make a multi-stage apparatus. These various features include, in the simpler apparatus, a single feed point to the rotating apparatus, which produces an intermittent feed to the individual separation cells. Another feature is a through the shaft feed system, which involves a more complex piece of apparatus, but which achieves a continuous feed to each and every individual cell and a smoother operation. Both embodiments produce product continuously and in a single step, which is an important advantage over much of the prior art. Various different kinds of heating means can also be provided.

The invention also provides processes in which the simple or more complex apparatus can be used, as well as having the ability to accommodate a multi-stage apparatus having combined features falling within the teachings of the art. This process or circuit may easily achieve an efficient conservation of energy and auxiliary matter to thereby yield further advantages to practical embodiments of the invention.

Thus, there is provided method and apparatus of the character described which is efficient, sure and economical in use, yielding great advantages over many different prior known devices and methods, which yields an acceptably pure product in a single continuous production step, and yet which is reliable and simple in construction and in operation.

The above and other advantages of the invention will be pointed out or will become evident in the following detailed description and claims, and in the accompanying drawings also forming a part of the disclosure, in which

Referring now in detail to the drawing, there is shown a first embodiment 10 of a centrifuge apparatus embodying the invention. Apparatus 10 comprises an outer housing 11 which comprises a top circular wall 12, a side peripheral cylindrical wall 14, a bottom annular wall 16, a peripheral cylindrical throat wall 18 connected at its upper end to the inner end of bottom wall 16, and a flange 20 extending outwardly from the bottom end of peripheral wall 18. Within housing 11 there is provided a rotor assembly 21 mounted on a shaft 22. The shaft 22 is journaled in an upper bearing 24 in wall 12 and in a lower bearing 26 mounted on a spider 28 in throat 18. Shaft 22 is formed with a central opening 30 through which the feed of charge stock of desired crystallizable product, impurities, and auxiliary matter is fed to the apparatus 10. Opening 30 is blind in shaft 22 and terminates at a location between the bearings 24 and 26, at which location the shaft is formed with a plurality of passageways 32 located in a plane normal to the axis of the shaft. Four passageways 32 are shown by way of example, more or less could be provided in any specific apparatus. The passageways supply the charge to an annular manifold 34 by means of a plurality of short conduits 36. Annular manifold 34 comprises an inner cylindrical wall 38, an outer cylindrical wall 40, and a pair of torus shaped walls 42 interconnecting the upper and lower ends, respectively, of the inner and outer cylindrical walls 38 and 40. The ends of the conduits 36 are held in suitably formed openings in the side of shaft 22 and inner cylindrical wall 38 by any suitable means.

Figures 1, 2, 3:
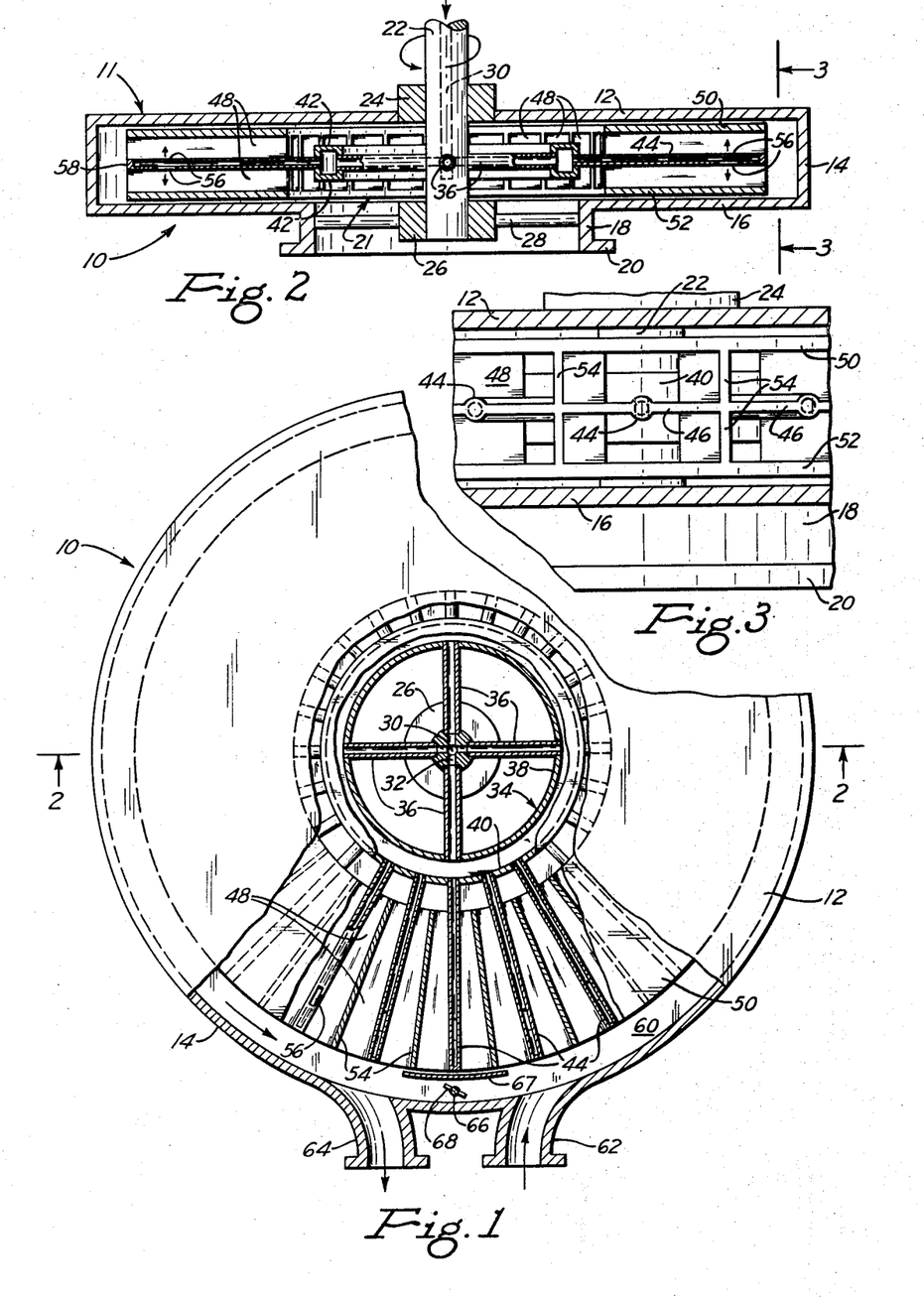
FIG. 1 is a top plan view of a first embodiment of a centrifuge apparatus, with some parts broken away and in cross-section.
FIG. 2 is a cross-sectional elevational view of the first embodiment taken generally on line 2—2 of FIG. 1.
FIG. 3 is a partial cross-sectional view of a detail taken on line 3—3 of FIG. 1.

Mounted on annular manifold 34 is the remainder of the rotor 21 of FIGS. 1 and 3. Fixed into suitable formed openings in wall 40 are a plurality of feed pipe portions 44. Referring to FIG. 3, it can be seen that the portions 44 are part of or formed in a horizontal annular central web 46. The radial separation cells 48 themselves are further defined, in conjunction with web 46, by means of a top annular wall 50, and a bottom annular wall 52. Radial webs 54 interconnect the central web 46 with the top and bottom walls 50 and 52 at equally spaced locations between the radial pipe portions 44 all around the rotor 21. The pipe portions 44, see FIG. 2, are each formed with upper and lower feed supply openings 56, whereby the charge mixture is fed to each pair of upper and lower cells serviced by each pipe portion 44. Of course, the pipe portions are closed at their outer ends by suitable means such as a plug portion 58. Thus, there is provided in rotor 21 a relatively large number of individual separation cells 48, each of which is open at its inner and outer radial ends. Each cell is defined by the central web 46 and either the top or bottom wall 50 or 52, as well as an adjacent pair of the radial webs 54. Each pair of cells, upper and lower, are serviced by one pipe or conduit portion 44 formed in the central web 46. Other arrangements are possible within the invention. For example, a rotor could be formed so that one pipe portion could serve four cells if the pipe portion were at their common line of juncture. If the cells had some other shape, even more, cluster fashion, might be served by each pipe portion. Rotor 21, as well as all other rotating parts of the other embodiments, will be suitably statically and dynamically balanced, in accordance with good engineering practice.

The radial length of the cells 48 is important in the operation of the invention, as will be set forth in detail below. Also, this length in relationship to the configuration of certain other parts is critical, particularly the location of the supply openings 56 along the radial length of the pipe portions 44. It is presently thought that the distance between the inner ends of the cells and the throat 18 is not important. The square or rectangular cross-sectional shape of the cells 48 in this as well as the other embodiments is exemplative only. Many other shapes, triangular, honeycomb, hexagonal, round, or the like, could also be used, and in all cases, sharp corners should be avoided.

Means are provided to flow and circulate a portion of the molten product as a carrier for the newly produced product crystals through the annular space 60 around substantially the entire periphery of rotor 21 and the inside surface of wall 14. Return and outlet nozzles 62 and 64, respectively, are formed in the peripheral wall 14 closely spaced to each other to flow this carrier in the manner indicated by the arrows on FIG. 1. This carrier flowed through space 60 is externally heated and the product crystals externally melted, as will be explained in greater detail below in regard to the process of FIGS. 6 and 7. Thus, the carrier comprises a recirculating loop of a suspension of crystalline and molten product. Any suitable heating means for the melting of crystals can be used. Of course, due regard must be given to the nature of the product. Examples of heat sources include steam, flue gases, electric heating means, and the like. Wherever possible, the heat of condensation of the auxiliary matter after recompression may be utilized in the overall process rather than simply wasted. Whatever heat source is used, a reasonably good control on the heat will also be required. Such controls are within the expertise of those skilled in the art. Examples of suitable overall processes are shown in the subsequent figures of the drawing and are described below.

Means are also provided to create a pressure differential between the inlet and outlet nozzles 62 and 64 to aid in the flow of this heated suspension from one to the other of said nozzles through the external heating system. To this end, a shaft 66 is journaled by means not shown in the walls 12 and 16, and carries a deflector vane 68. A manual control, not shown, is provided on the outside of the main casing 11 to adjust the position of shaft 66 and vane 68 to thereby control the flow of heated carrier, by setting up this pressure differential. A similar structure is shown more in detail at the left side of the multi-stage device of FIG. 7. The operation of this first embodiment 10 will be explained below in conjunction with the operation of the second embodiment of FIGS. 4 and 5. A shield 67 is also provided at the vicinity of the parts 66 and 68 to reduce turbulence at this region of changing flow directions.

Figure 4:
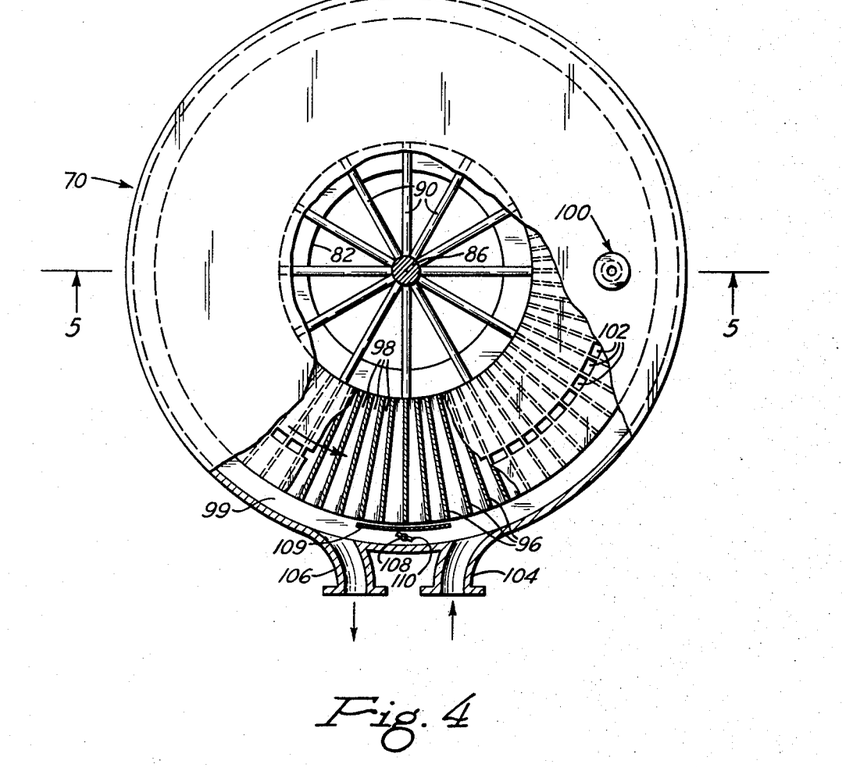
FIG. 4 is a view similar to FIG. 1 showing a second embodiment of a centrifuge apparatus according to the invention.
Figure 5:
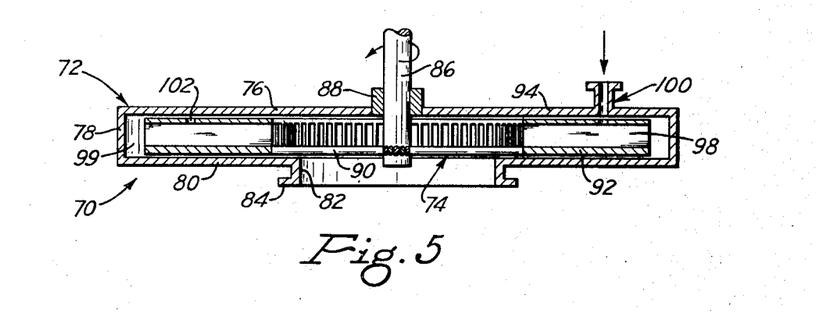
FIG. 5 is a cross-sectional elevational view of the second embodiment taken generally on line 5—5 of FIG. 4.

Referring now to FIGS. 4 and 5, there is shown a second embodiment 70 of a centrifuge apparatus embodying the invention. Apparatus 70 comprises outer casing 72 and a rotor assembly 74. Casing 72 is similar to casing 11 of FIG. 1 and comprises a top wall 76, a peripheral cylindrical wall 78, a bottom annular wall 80, a throat 82 at the inside of the wall 80, and a bottom mounting flange 84 at the bottom end of throat 82. Rotor 74 comprises a shaft 86 which is journaled in top wall 76 by means of a bearing 88. A plurality of spokes 90 are fixed to the bottom end of the shaft 86 by any suitable means and extend radially outwardly to a bottom annular cell defining flange 92. A top annular cell defining flange 94 is joined to the bottom flange 92 by means of a plurality of radial webs 96. Thus, there is provided a single circular array of separating cells 98, each defined by the top and bottom walls 92 and 94 and a pair of adjacent webs 96.

Means are provided to supply charge stock to the cells seriatim. To this end, a supply nozzle 100 is formed in top casing wall 76 at a selected radial location thereon with respect to the radial length of the cells 98. Top cell defining flange 94 is formed with a ring of supply openings 102 arranged so as to fall under supply nozzle 100. A space 99, similar to space 60 of embodiment 10, is also provided for the carrier product suspension flow around the outside of the rotor 74.

As in the first embodiment, means are provided to flow and control the carrier flow through the space between peripheral wall 78 outside of the cells of the rotor 74. To this end there is provided return and outlet nozzles 104 and 106, respectively, and a shaft and vane assembly 108 and 110. Parts 104 through 108 correspond in structure and operation to the parts 62 through 68 of the embodiment 10 described above. Similarly, a shield 109, the counterpart of the item 67 of FIG. 1, is also provided.

In operation, the two embodiments 10 and 70 are quite similar, the major difference being that the embodiment 10 has continuous feed to each and every cell 48, whereas the cells 98 of the second embodiment 70 receive fresh charge only when they pass under the supply nozzle 100. In other constructions, many modifications are possible, such as a plurality of supply nozzles like 100 arranged in a circle. The embodiment 70 is a substantially simpler piece of apparatus than is the embodiment 10, and both forms have the advantage over the prior art of continuous product yield. Thus, it might be anticipated that the more complex apparatus would be used in a high volume of one product situation, and the simpler apparatus of embodiment 70 would be used in other installations, including testing and experimental.

For purposes of durability and employment of existing technology, it is anticipated that both embodiments 10 and 70 of the centrifuge apparatus portion of the invention would be made entirely of common metals such as stainless steel or even carbon steel. However, depending upon the charge stock operated upon, as well as the size of the installation, size being measured either in terms of volume of product or physical sizes, the centrifuge apparatus could be made out of other materials such as forged metals and the like. Generally, the construction material requirements for apparatus embodying the invention are less demanding than for other chemical processes such as distillation, in that the invention process operates generally at lower temperatures.

For the sake of clarity, the meanings of a number of key words and terms as used in the specification and claims herein shall be understood to be as follows:

Product — any crystallizable material having a higher specific gravity than its mother liquor, having a melting temperature less than its decomposition temperature, and otherwise susceptible to being separated or refined by the invention;

Feed — the raw material of product plus impurities;

Auxiliary Matter or Liquid — a suitable material which will undergo a gas/liquid change of state at the temperatures and pressures required to refine a particular product from some particular feed;

Charge — feed plus auxiliary matter; and

Mother Liquor — the material remaining after the product is refined out of the charge, which may or may not include the auxiliary matter, depending upon whether or not the auxiliary matter is miscible with the feed, and which may include some dissolved product.

The auxiliary matter is selected for a particular product giving consideration to its selectivity, volatility, heat of vaporization, density, and product miscibility, all at the operating temperatures and pressures. The invention provides for the use of auxiliary matters which are both miscible and immiscible with the product and other materials. The auxiliary matter can also serve as a solvent.

As mentioned above, the essential principles of operation are identical in both cases. Start-up comprises first filling the system with liquid feed, and then flushing the remaining portions with a suitable safe gas, all more or less in line with conventional techniques. Thereafter, the flow of auxiliary matter can begin.

Once start-up is completed and the process is working normally, the charge, comprising a mixture of desired substance, impurities and auxiliary matter, is supplied to the cells at a selected location therein intermediate their radial ends. Generally, the location of supply depends upon the relation between the dimensions of the apparatus and the speed of rotation. The centrifugal force must develop sufficient pressure at the supply location under the dynamic conditions of normal operation as to prevent the auxiliary matter from immediately vaporizing at the supply locations. The charge stock then enters the cells via either the openings 56 of embodiment 10 or the openings 102 of embodiment 70 and are thus subject to the temperature and pressure set up in the respective region. As will be explained below, suitable control equipment causes the charge in the process space to flow radially inwardly in the direction of decreasing pressure. The mix gradually splits into three phases starting close to the zone of the opening in each cell. The volatile auxiliary matter begins to vaporize, thus absorbing its heat of vaporization which results in a gradual drop in temperature in the length of the cell. This drop in temperature causes an immediate supersaturation of the crystallizable material in its mother liquor and the formation of crystals of product. Since, as stated as an initial condition, the crystalline desired product is heavier than the impurities, the crystalline product migrates radially outwardly in the cells because of centrifugal force. Further, a temperature gradient is set up radially in the cells increasing from inside to outside. The lighter remaining process liquid, consisting of impurities and saturated with product and auxiliary matter, migrates radially inwardly from the location of the openings 56 or 102, gradually giving up more and more product and auxiliary matter, and finally spills out of the inner ends of the cells as a mother liquor to exit vertically downwardly out of the throat 18 or 82. As is now evident, the invention method causes the flow of newly formed product crystals to move countercurrent through the moving process liquid to thus inherently "wash" the product crystals. This desirable cleansing action is further enhanced, as will be set forth below with regard to the processes, by causing some product to reflux from the outer cell opening towards the zone of crystal formation in the cells.

Figure 6:
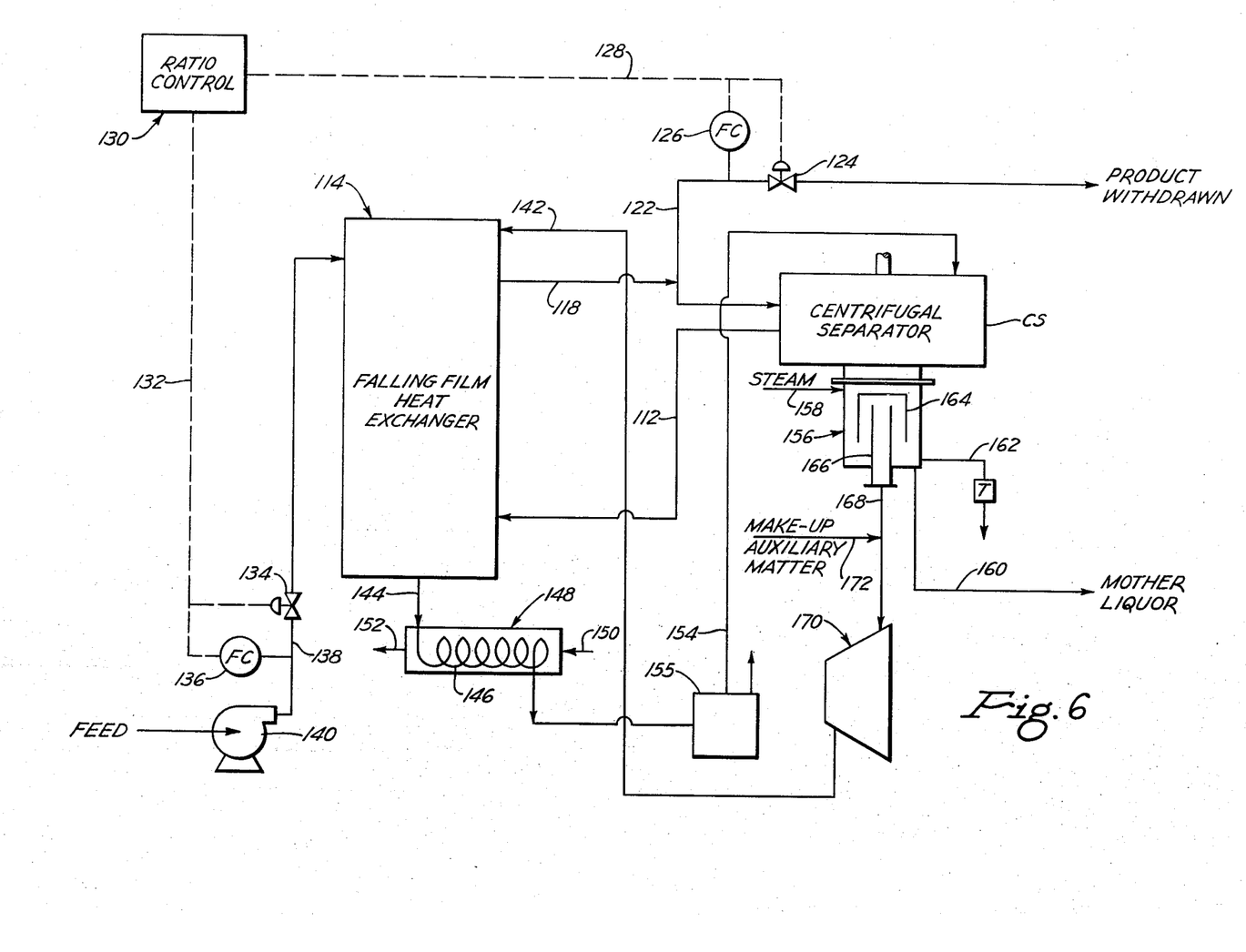
FIG. 6 is a schematic diagram of an overall process in which the centrifuge apparatus of FIGS. 1, 4 or 7 may be incorporated.

The crystals travel radially outwardly in the cells until they reach the outer openings, leave the cells, and stay suspended in the melt circulating in the space 60 or 99 between the outer casing well and the outside of the rotor. As operation continues, a relatively large body of moving suspension of crystals in melted purified product sets up in the space 60 or 99 between the outer casing wall and the outside of the rotor. The vane 68 or 110 can be set to control the flow of the suspension via the lefthand outlet nozzle through an outside heating loop (as shown in FIG. 6) where the crystals are melted. A small portion of the resulting homogenous liquid is drawn off as product while the major portion returns back into the apparatus through the nozzle 62 or 104. A large part of this major portion serves as a crystal carrier while the remaining minor portion, the reflux, is displaced by the incoming crystals and is forced to travel radially inwardly through the cells where it assures the washing action, thereby enhancing the purity of the product drawn off. The reflux combines with the charge being supplied and takes part in the processes occurring in the region of vaporization, nucleation and crystal growth.

It is this action beginning from the entrance of the feed through the openings into the cells and the separation thereat which is the nub of the invention. In summary, at the zone of the openings or entrance of feed into the cells, there occurs the simultaneous processes of vaporization of the auxiliary matter to take in heat, and nucleation and crystal growth of the desired substance which produces that heat, while the centrifugal force causes a separation both inwardly (auxiliary matter and impurities) and outwardly (product) from this zone of activity. Heat control is also required to assure that no unmelted product occurs at the warmer branch of the recirculation heating loop. Unmelted product in this zone could cause fouling.

Another facet of the invention is that each of the cells 48 and 98 is relatively narrow so that no substantial turbulence can extend from space 60 and 99 into the cells. Thus, the product is formed in the relatively calm cells to thereby assure proper functioning of the critical processes which occur therein, while at the same time the annular spaces 60 and 99 are relatively turbulent to assure that the product is thoroughly melted, completely carried off, and that no "pockets" or eddys form to disrupt normal functioning or foul the apparatus.

The process of FIG. 6 can be used only where the auxiliary matter and the desired product are miscible with each other. The case where the desired product and the auxiliary matter are not miscible requires an apparatus with dual supply nozzles, e.g., like in each stage of the apparatus, of FIG. 7. Referring now to FIG. 6, there is shown a schematic diagram of a process in which any of the centrifugal separators of the invention, i.e., the apparatus of FIG. 1, 4 or the like, can be used. For this reason, the centrifugal separator in FIG. 6 is indicated by the reference letters "CS." Product suspension is drawn off from the separator CS and flows via a line 112 to the inlet end of the shell side of a falling film heat exchanger 114. Heat exchanger 114 is a shell and tube type through which desired product flows on the shell side from the inlet line 112 to an outlet line 118. The shell may comprise a plurality of cross baffles, not shown. Such heat exchangers are well known in the art.

Line 118 delivers the heated and melted product to a line 122, the flow in which is controlled by a valve 124 and is measured by a flow controller 126. The setting of valve 124 controls the split of the flow into the amount of product drawn off from the process, indicated to the right of said valve 124, and the remaining amount which is returned back to the separator. This return is indicated by the other end of line 122 which flows back to the separator CS. The dotted line 128 from the two components 124 and 126 leads to a control means 130, whose function will be described below. Another control line 132 leads from the controller 130 to a valve 134 and a flow controller 136 both associated with a line 138 from a pump 140 which supplies raw feed from a suitable source, not shown, to the upper end of the tube bundle of heat exchanger 114. The liquid feed flows as a falling film wetting the walls of the tubes in the well known manner. Another line 142 delivers compressed auxiliary matter to the upper end of the tube bundle. The vapor is absorbed by the falling film while the heat released by this process is removed through the tube walls where it is absorbed by the suspension flowing in the shell. This results in the gradual disappearance of the crystals present in the suspension into the melt.

The liquid mixture of fresh feed and recycled auxiliary matter which constitutes fresh charge to separator CS exits by gravity from the lower end of the heat exchanger casing 120 via a line 144, and passes through the coil or tube bundle 146 of a cooler 148, the outer casing of which accommodates a flow of a suitable coolant such as water, which coolant flow is indicated by the two arrows 150 and 152. A line 154 delivers the combined liquid charge stock consisting of fresh feed and auxiliary matter from the heat exchanger 148 to the input of the centrifugal separator CS. While the entrance of line 154 is shown at the top of the separator, this is by way of example only, it being understood that the charge can be supplied wherever dictated by the nature of the separator being used. The mother liquor, contaminants and vapor of the auxiliary matter flowing inwardly through the inside of the rotor of which ever separator CS is in use, flows from the separator CS into a liquid-gas separating device 156.

Heat to aid in the separation of solvent and mother liquor at device 156, in the form of steam for example, is supplied to the outer casing of separator 156 as indicated by line 158. Since the mixture of gaseous auxiliary matter and mother liquor is rotating when it enters the separator 156, the heavier mother liquor moves to the outside of the separator, and migrates downwardly under the influence of gravity to be finally removed via a line 160. A line 162 containing a steam trap "T" is provided in the conventional manner and for the conventional purposes. Suitable separators such as 156 are well known in the art, and by way of illustration, a combination of an inverted U-shaped baffle 164 with a demister not shown and a gaseous auxiliary matter withdrawal tube 166 located with its intake end under the baffle may be provided. This arrangment of the parts 164 and 166 assures that only gaseous auxiliary matter will be drawn out of separator 156. By spreading the mother liquor into a film on the casing wall of the separator 156, in addition to adding heat via the steam, any further dissolved auxiliary matter is caused to vaporize out of the mothor liquor and be recovered. The recovered auxiliary matter is removed from the system by a line 168 which leads to an auxiliary matter compressor 170. Makeup auxiliary matter to accommodate for minor losses and the like is added to line 168 as indicated by a line 172. The compressed auxiliary matter leaves the compressor 170 via line 142 described above to be fed to the heat exchanger 114, thus completing the auxiliary matter cycle.

In operation, the recovered auxiliary matter via tube 166 is at about atmospheric pressure. This example operation portion will be described for naphthalene as the desired product to be recovered from a naphthalene fraction using butane as the auxiliary matter. Compressor 170 supplies butane at about 100 psig, and it is of course heated by the compression to a temperature, typically, of about 170°C. The hot compressed butane is cooled and is absorbed by the relatively cold raw feed from line 138 in the tube bundle of the heat exchanger 114, and the charge is prepared by absorption of the butane into the naphthalene fraction. In this example, naphthalene and butane, the charge ratio could be about 1.25 to 1. This ratio is made so that mother liquor temperature will be about 20°C. The speed of rotation in this example will be such that a pressure of about 90 psig will develop at the supply nozzle. Generally, the pressure should be such as to prevent the charge from boiling prematurely. The heat of absorption is advantageously used to melt the crystalline product carried by its melt through the shell of the heat exchanger. Conversely, one could think of the action in heat exchanger 114 as a use of the product as a coolant for the newly mixed charge stock. The charge stock then moves via line 144 through heat exchanger 148 where the coolant in lines 150 and 152, preferably water in this example, brings the temperature of the charge to just slightly above the crystallization temperature of the naphthalene, about 65°C. A separator 155 is provided in line 154 after cooler 148 to remove any non-condensable gases which may by happenstance be present in the recycle, in the usual manner. Such stray materials would retard the absorption process.

The use of the heat exchanger 114 to both remove the heat of condensation of the auxiliary matter to liquify it and combine the feed with the auxiliary matter by absorption has several advantages over a simple condensation scheme. For example, such a scheme would have to operate at a higher pressure, or else would have to waste heat in order to operate at pressures such as are used in the invention method. The pressure of the gaseous auxiliary matter from the compressor must be such that the auxiliary matter will liquify in the heat exchange. Accordingly, in determining this pressure, consideration must be given to the temperature on the other side of the heat exchange, and whether simple condensation or absorption is being used.

The ratio controller 130 has an overall control on the system by means of its operation of the valves 124 and 134, and in accordance with the flow data transmitted to the controller by the devices 126 and 136. Any desired resonable yield of product with respect to feed can be obtained by suitable manipulation of the controller 130 which in turn manipulates the valve 124 and 134 accordingly.

Figures 7, 8, 9:
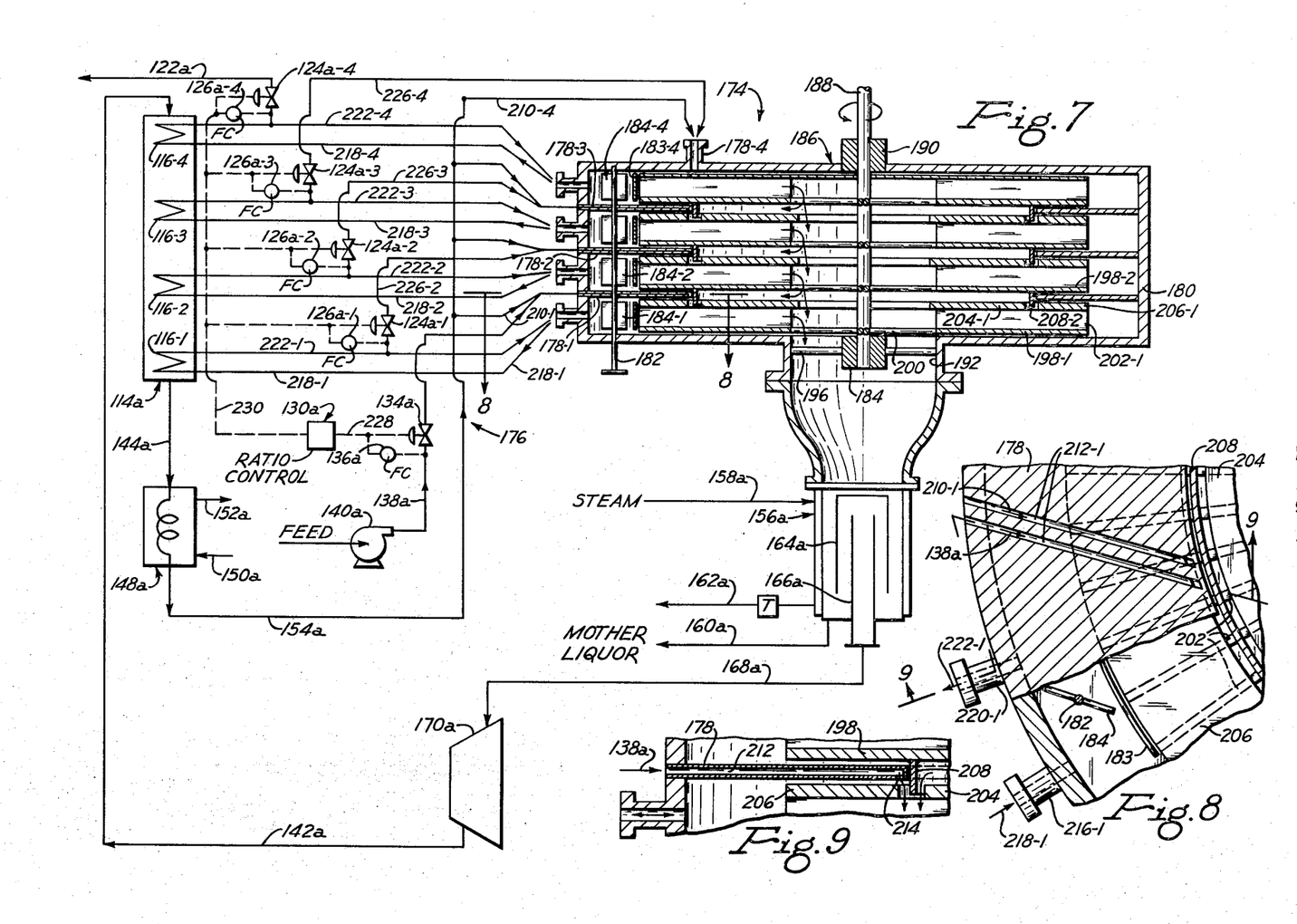
FIG. 7 is a combined schematic diagram of a process similar to that shown in FIG. 6 plus a view similar to FIGS. 2 and 5 of a third embodiment comprising a multi-stage centrifuge apparatus.
FIG. 8 is a cross-sectional view of a detail taken generally on line 8—8 of FIG. 7.
FIG. 9 is a cross-sectional view of another detail taken generally on line 9—9 of FIG. 8.

Referring now to the remaining FIGS. 7, 8 and 9, there is shown a third embodiment of a centrifugal separator 174 integrated into an overall system or process 176. The apparatus and associated system shown in FIG. 7 has two features not heretofore disclosed. Firstly, there is shown a multi-stage centrifugal separator, which type of mechanism is, generally, useful where a higher degree of purity of refined product is desired. It is to be understood, of course, that "stacking" or building up of a multi-stage device could also be accomplished using the principles of the single stage devices of the previous embodiments, suitable modifications being made in manners well known to those skilled in these arts. The second feature is the disclosure of a manner of operating with an auxiliary matter which may not be miscible with the desired product. Here again, this concept as set forth in FIG. 7 could be "borrowed" and fit into any of the prior embodiments with only suitable relatively minor changes.

In the following detailed description, for the sake of simplification of the drawing and this specification, parts which are the same as or closely similar to those described above will be indicated by the same reference numeral used above, followed by the letter *a*. Further, since many of the parts of this system are repeated from stage to stage, such repeated parts will be indicated by dash numbers from -1 to -4 following the references numeral to indicate the four stages shown by way of illustration. Both the *a* and the dash numbers will be used together where appropriate.

Starting in the generally lower left part of FIG. 7, the feed is supplied via the parts 134*a* through 140*a* as before, and enter a stationary annular feeder disc 178-1 of the first and lowest stage. A disc 178-2 and 178-3 is provided to feed the second stage and the third stage, respectively, and a pair of nozzles 178 serve the function of the disc for the fourth stage. These discs are shown more clearly in FIGS. 8 and 9, and are described in greater detail below.

The feed means (disc and nozzles) 178 are mounted in and form a part of an outer casing 180 of separator 174. For the same purpose and in the same number as the parts 66 through 68 of the first embodiment and 108 through 110 of the second embodiment, casing 180 carries a shaft 182 on which is mounted four vanes 184, one for each stage, and shields 183 are also provided. The multi-stage rotor is built on a shaft 188 which is journaled in the top wall of the casing by a bearing 190 and in the throat of the casing by means of a bearing 194 carried on a spider 196 fixed in throat 192. The first stage of the rotor comprises a bottom plate 198 which is fixed to the shaft 188 by means of a plurality of spokes 200. A plurality of radially disposed cell defining vanes 202 are mounted on the bottom plate 198, and the separation cells are closed at their top ends by inner and outer rings 204 and 206. A relatively small space is provided between the two rings 204 and 206 in their common plane at the top of the process cells. Referring to FIG. 9, the bottom plate 198 of the second, third and fourth stages each carries a cylindrical baffle plate 208 which extends downwardly from its associated bottom plate in front of the inner end of the associated feeder disc 178 and terminates inside of the space between the rings 204 and 206 closely adjacent above the separation cells of the next lower stage of the rotor 186.

Means are also provided to separately feed recycled auxiliary matter from the line 154*a* to the feeding means 178 of all the stages. The flow of auxiliary matter is substantially identical to that shown in FIG. 6, with the exception that the line 154 is tapped to feed each of the four stages. Feeder lines 210 off of that line 154*a* supply auxiliary matter to each of the stages.

Referring now to FIG. 8, it can be seen how the lines 138*a* and 210-1 separately supply feed and auxiliary matter to the lowermost or first separation stage by means of a pair of passageways 212 formed in each feeder disc 178. Passageways 212 deliver their materials to the space between the rings 204-1 and 206-1. Since the desired product and the auxiliary matter may not be miscible, premixing as in FIG. 6 may not be feasible, and thus these materials are brought together right at the zone of separation, i.e., the entrances to the individual separation cells of each stage of the rotor. The separation thereafter at each stage or layer of separation cells is the same as described above in regard to the first two embodiments. As shown in FIG. 9, the passageways 212 terminate at openings 214 in the bottom surface of the discs 178 to minimize the turbulence caused by the entry of the new substances into the materials already in the separation cells.

Means are provided, as before, to flow melted product from each stage as a carrier through the annular space outside the rotor and inside the cylindrical wall of the casing under the control of the vanes 184 to remove product exiting from the radial outer ends of the cells for each respective stage. Means are additionally provided to cascade this product from stage to stage moving upwardly in the apparatus of FIG. 7 to thereby further enhance the purity of the final product withdrawn by the line 122*a* in the uppermost lefthand corner. A heat exchanger 114*a*, as before, is part of the auxiliary matter and product cycling and heat exchange system, but this heat exchanger includes four heat exchange coils or bundles, one for each stage, each labelled 116 plus a dash number. Referring simultaneously to FIG. 8 and the left hand side of FIG. 7, carrier and reflux enter the system via an inlet nozzle 216 fed by a line 218, and exit from each stage viz nozzle 220 which cooperates with a line 222. The driving force is inherent in the system in that the pressure is much greater at the outer ends of the cells than it is at the vicinity of supply to the cells because of the difference in rotor diameter at these two regions. Means are provided to tap a predetermined portion of the feed in each line 222 and to supply that tapped portion to the inlet means 178 of the next higher stage. To this end, a valve 124*a* in each line 226 is provided and is disposed in the manner shown in the drawing. The last valve 124*a*-4 controls the flow in the final output line 122*a*. Thus, the manner in which product is divided for cascade up to the next stage and return back to the previous stage is easily controlled by each valve 124*a* in a manner functionally identical to the operation of valve 124 in line 122 of FIG. 6.

Thus, the increasingly pure product moves upwardly from stage to stage, and the increasingly concentrated impurities move downwardly from stage to stage. The multi-stage form of the invention has an important advantage over prior systems in that the product is melted and crystallized again and again at each stage, thus tremendously increasing its purity. The vaporous streams of auxiliary matter from all the stages combine and leave the apparatus via throat 192, together with the mother liquor from the lowest and first stage. The auxiliary matter is recovered by suitable separation in the same manner as described above in regard to FIG. 6.

The controller 130a, via its lines 228 and 230, in a manner similar to that described above, controls the yield and system overall.

As shown by the arrows on FIG. 7, the impurities overflow the inner edge of each bottom plate 198, and combine with the stream being fed to the next lower stage. The gaseous auxiliary matter from each stage combine together and flow axially down and out of the apparatus.

The invention apparatus can be arranged to operate either in series as in FIG. 7, or in parallel as in FIG. 2, depending on whether high purity or high capacity is sought. The maximum number of stages employed is limited by mechanical considerations only. Further, both series and parallel separation can be performed in a single combined apparatus, as will be clear to those skilled in the art.

The invention method including an auxiliary matter which changes state in the process as described above is preferred because of the efficient flow of heat inherent in the state change. However, it is also possible using the teachings of the invention to operate with an auxiliary matter which does not change state and thus only carries sensible heat, but it is thought that such an auxiliary matter would produce a system much less efficient than the preferred form.

No compression is necessary if heat regeneration is not convenient and if a product with a higher crystallization point is being purified. In such case, a less volatile auxiliary matter can be chosen which may be condensed at about atmospheric pressure.

The multi-stage embodiment of the invention represents what can be called a crystallizing column. Analogy exists here with other multi-stage counter-current operations and apparatuses which are used in chemical processing. It may be arranged with both enriching and exhausting (stripping) section, with feed inlet between these two sections. In many cases a specific solvent will be added (usually to the highest or next to the highest stage) in order to improve the separation by either raising the solubility of removed contaminants or suppressing the solubility of the recovered product or both. This is analogous to the process of extractive distillation and concerns operations with the highest purity requirements, e.g., separation in special situations where solid solutions are formed. In some cases, "product" and "mother liquor" as used above could be reversed, and an undesirable crystallizable substance may be removed while the remaining "mother liquor" would in fact be the product. In such a case the crystals need not be melted and methods other than heating may be employed for their removal (e.g., filtration, sedimentation, etc.).

While the invention has been described in detail above, it is to be understood that this detailed description is by way of example only, and the protection granted is to be limited only within the spirit of the invention and the scope of the following claims.

I claim:

1. A method of refining a crystallizable product from a substantially liquid feed comprising said product in non-crystalline form and impurities, wherein the product crystals have a higher specific gravity than their mother liquor, and wherein the product crystals melt at a temperature less than the temperature at which they decompose, comprising the steps of selecting an auxiliary liquid which will vaporize at the operating temperature and pressure at which the product crystals are formed, subjecting the charge of feed and auxiliary liquid to a region of centrifugal force and said operating temperatures and pressure to cause the auxiliary liquid to gradually vaporize and absorb heat and to simultaneously cause crystals of said product to form to produce said heat and which crystals immediately upon formation migrate outwardly while the mother liquor immediately migrates inwardly countercurrent to the flow of newly formed product crystals, whereby heat flow is balanced in said region and whereby product crystals migrate outwardly in increasing concentration and impurities migrate inwardly in increasing concentration said step of causing simultaneous auxiliary liquid vaporization, crystal formattion, and crystal and mother liquor migration being performed in a relatively large number of relatively small radially disposed separation cells, wherein said centrifugal force is generated by causing said cells to rotate about their common axis, continuously supplying charge stock to said separation cells, and continuously removing refined product crystals which have migrated radially outwardly of said cells.

2. The method of claim 1, wherein said charge stock is continuously supplied to each of said separation cells individually.

3. The method of claim 1, wherein said charge stock is continuously supplied to all of said separation cells seriatim.

4. The method of claim 1, melting the crystalline product after it has left said region of the centrifugal force and auxiliary liquid vaporization to facilitate the removal of said product, wherein said continuous product removal step is performed by flowing a suspension of newly formed crystals in their melt as a carrier around substantially the entire periphery of the radial outer ends of all of said rotating separation cells.

5. The method of claim 1, wherein said auxiliary liquid and said feed are miscible with each other and said charge is a liquid, and mixing said auxiliary liquid and said feed together to form said liquid charge prior to the step of subjecting said charge to said region.

6. The method of claim 1, wherein said auxiliary liquid and said feed are immiscible with each other, and separately supplying said auxiliary liquid and said feed to said region to thereby form said charge simultaneously with the step of subjecting said charge to said region.

7. The method of claim 1, separating the mother liquor from the auxiliary liquid after it has migrated inwardly so as to have left said region, compressing the vaporized auxiliary liquid, and flowing at least the compressed auxiliary liquid portion of said charge into heat exchange communication only with the removed product.

8. The method of claim 7, wherein said auxiliary liquid and said feed are miscible, and flowing both said compressed auxiliary liquid and said feed together with each other and into heat exchange communication only with the removed product, to thereby combine said auxiliary liquid and said feed by absorption to form said charge and to simultaneously remove the heat of condensation from said charge prior to the step of subjecting said charge to said region.

9. The method of claim 1, and ganging a plurality of refining stages in series by dividing the product removed from a first stage into a first stream which is fed to a second stage with said auxiliary liquid and into a second stream which is returned back to said first stage as product carrier and reflux to thereby enhance the purity of the product finally withdrawn from a subsequent stage after said second stage, and overflowing mother liquor from said second stage to said first stage, whereby product moves in one direction with increasing purity and mother liquor moves in an opposite direction with increasing concentration.

10. The method of claim 9, and combining the auxiliary liquid migrating inwardly from all of the stages into a single stream.

* * * * *